US012748955B2

(12) United States Patent
Badia et al.

(10) Patent No.: US 12,748,955 B2
(45) Date of Patent: Sep. 29, 2026

(54) REINFORCEMENT LEARNING WITH ADAPTIVE RETURN COMPUTATION SCHEMES

(71) Applicant: GDM Holding LLC, Mountain View, CA (US)

(72) Inventors: Adrià Puigdomènech Badia, London (GB); Bilal Piot, London (GB); Pablo Sprechmann, London (GB); Steven James Kapturowski, St. Albans (GB); Alex Vitvitskyi, St. Albans (GB); Zhaohan Guo, London (GB); Charles Blundell, London (GB)

(73) Assignee: GDM Holding LLC, Mountain View, CA (US)

( * ) Notice: Subject to any disclaimer, the term of this patent is extended or adjusted under 35 U.S.C. 154(b) by 883 days.

(21) Appl. No.: 17/797,878

(22) PCT Filed: Feb. 8, 2021

(86) PCT No.: PCT/EP2021/052988

§ 371 (c)(1),
(2) Date: Aug. 5, 2022

(87) PCT Pub. No.: WO2021/156518

PCT Pub. Date: Aug. 12, 2021

(65) Prior Publication Data

US 2023/0059004 A1 Feb. 23, 2023

Related U.S. Application Data

(60) Provisional application No. 62/971,890, filed on Feb. 7, 2020.

(51) Int. Cl.
*G06N 3/047* (2023.01)
*G06N 3/006* (2023.01)
(Continued)

(52) U.S. Cl.
CPC ............. *G06N 3/047* (2023.01); *G06N 3/045* (2023.01); *G06N 3/08* (2013.01)

(58) Field of Classification Search
CPC .......... G06N 3/047; G06N 3/045; G06N 3/08; G06N 3/084; G06N 3/09; G06N 3/092;
(Continued)

(56) References Cited

U.S. PATENT DOCUMENTS

| | | | | |
|---|---|---|---|---|
| 2017/0032245 A1* | 2/2017 | Osband | .................. | G06N 3/045 |
| 2018/0032863 A1* | 2/2018 | Graepel | ................. | G06N 3/045 |
| 2018/0165603 A1 | 6/2018 | Van Seijen et al. | | |

FOREIGN PATENT DOCUMENTS

| | | |
|---|---|---|
| CN | 110114783 A | 8/2019 |
| CN | 110520868 A | 11/2019 |
| JP | 2019537136 | 12/2019 |

OTHER PUBLICATIONS

Zheng et al., On Learning Intrinsic Rewards for Policy Gradient Methods, Jun. 22, 2018, https://arxiv.org/abs/1804.06459 (Year: 2018).*

(Continued)

*Primary Examiner* — Kakali Chaki
*Assistant Examiner* — Molly C Sippel
(74) *Attorney, Agent, or Firm* — Fish & Richardson P.C.

(57) ABSTRACT

Methods, systems, and apparatus, including computer programs encoded on a computer storage medium, for reinforcement learning with adaptive return computation schemes. In one aspect, a method includes: maintaining data specifying a policy for selecting between multiple different return computation schemes, each return computation scheme assigning a different importance to exploring the environment while performing an episode of a task; selecting, using the policy, a return computation scheme from the multiple different return computation schemes; controlling an agent to perform the episode of the task to maximize a
(Continued)

return computed according to the selected return computation scheme; identifying rewards that were generated as a result of the agent performing the episode of the task; and updating, using the identified rewards, the policy for selecting between multiple different return computation schemes.

14 Claims, 4 Drawing Sheets

(51) Int. Cl.
*G06N 3/0442* (2023.01)
*G06N 3/045* (2023.01)
*G06N 3/0464* (2023.01)
*G06N 3/08* (2023.01)
*G06N 3/084* (2023.01)
*G06N 3/09* (2023.01)
*G06N 3/092* (2023.01)
*G06N 7/01* (2023.01)

(58) Field of Classification Search
CPC ........ G06N 7/01; G06N 3/006; G06N 3/0475; G06N 3/0455; G06N 3/0895; G06N 3/091; G06N 3/094; G06N 3/096; G06N 3/098; G06N 3/0985; H04N 7/005
See application file for complete search history.

(56) References Cited

OTHER PUBLICATIONS

C. Oh and A. Cavallaro, "Learning Action Representations for Self-supervised Visual Exploration," 2019 International Conference on Robotics and Automation (ICRA), Montreal, QC, Canada, 2019, pp. 5873-5879, doi: 10.1109/ICRA.2019.8794401 (Year: 2019).*
Burda et al., "Large-Scale Study of Curiosity-Driven Learning," CoRR, Aug. 13, 2018, arXiv:1808.04355v1, 15 pages.
Office Action in European Appln. No. 21704741.4, dated Dec. 20, 2024, 8 pages.
Notice of Allowance in Japanese Appln. No. 2022-548005, dated Sep. 30, 2024, 5 pages (with English translation).
Office Action in Canadian Appln. No. 3,167,201, dated Oct. 3, 2023, 5 pages.
Office Action in Japanese Appln. No. 2022-548005, dated Sep. 4, 2023, 8 pages (with English translation).
Achiam et al., "Variational option discovery algorithms" Submitted on Jul. 2018, arXiv:1807.10299v1, 29 pages.
Allesiardo et al., "A Neural Networks Committee for the Contextual Bandit Problem" Submitted on Sep. 2014, arXiv:1409.8191v1, 8 pages.
Andrychowicz et al., "Learning dexterous in-hand manipulation" Submitted on Aug. 2018, arXiv:1808.00177v1, 27 pages.
Arjona-Medina et al., "Rudder: Return decomposition for delayed rewards" Advances in Neural Information Processing Systems 32, 2019, 12 pages.
Aubret et al., "A survey on intrinsic motivation in reinforcement learning" Submitted on Nov. 2019, arXiv:1908.06976v2, 39 pages.
Aytar et al., "Playing hard exploration games by watching youtube" Advances in neural information processing systems 31, 2018, 12 pages.
Badia et al., "Never give up: Learning directed exploration strategies" Submitted on Feb. 2020, arXiv:2002.06038v1, 28 pages.
Barreto et al., "Successor features for transfer in reinforcement learning" In Advances in neuralinformation processing systems, 2017, 11 pages.
Barto, "Intrinsic motivation and reinforcement learning" Intrinsically motivated learning in natural and artificial systems, 2013, 17-47.
Bellemare et al., "The arcade learning environment: An evaluation platform for general agents" Journal of Artificial Intelligence Research 47, Jun. 2013, 253-279.
Bellemare et al., "Unifying count-based exploration and intrinsic motivation" Advances in neural information processing systems 29, 2016, 9 pages.
Burda et al.,"Exploration by random network distillation" Submitted on Oct. 2018, arXiv:1810.12894v1, 17 pages.
Choi et al., "Contingency-aware exploration in reinforcement learning" Submitted on Mar. 2019, arXiv:1811.01483v3, 19 pages.
Ecoffet et al., "Go-explore: a new approach for hard exploration problems" Submitted on Jan. 2019, arXiv:1901.10995v1, 37 pages.
Eysenbach et al., "Diversity is all you need: Learning skills without a reward function" Submitted on Feb. 2018, arXiv:1802.06070v1, 15 pages.
Ferret et al., "Credit assignment as a proxy for transfer in reinforcement learning" Submitted on Jul. 2019, arXiv:1907.08027v1, 16 pages.
Fortunato et al., "Generalization of reinforcement learners with working and episodic memory" In Advances in Neural Information Processing Systems, 2019, 10 pages.
Fortunato et al., "Noisy networks for exploration" Submitted on Jun. 2017, arXiv:1706.10295v1, 17 pages.
Fu et al., "Ex2: Exploration with exemplar models for deep reinforcement learning" Advances in neural information processing systems 30, 11 pages.
Garivier et al., "On upper-confidence bound policies for non-stationary bandit problems" Submitted on May 2008, arXiv:0805.3415v1, 24 pages.
Gregor et al., "Variational intrinsic control" Submitted on Nov. 2016, arXiv:1611.07507v1, 15 pages.
Harutyunyan et al., "Hindsight credit assignment" In Advances in neural information processing systems, 2019, 10 pages.
Horgan et al., "Distributed prioritized experience replay" Submitted on Mar. 2018, arXiv:1803.00933v1, 19 pages.
Hung et al., "Optimizing agent behavior over long time scales by transporting value" Nature communications 10.1, 5223, Nov. 2019, 12 pages.
International Preliminary Report on Patentability in International Appln. No. PCT/EP2021/052988, mailed on Aug. 18, 2022, 9 pages.
International Search Report and Written Opinion in International Appln. No. PCT/EP2021/052988, mailed on May 28, 2021, 16 pages.
Jaderberg et al., "Population based training of neural networks" Submitted on Nov. 2017, arXiv:1711.09846v1, 21 pages.
Kapturowski et al., "Recurrent experience replay in distributed reinforcement learning" In International Conference on Learning Representations, Sep. 2018, 19 pages.
Ke et al., "Sparse attentive backtracking: Long-range credit assignment in recurrent networks" Submitted on Nov. 2017, arXiv:1711.02326v1, 13 pages.
Lanier et al., "Curiosity-Driven Multi-Criteria Hindsight Experience Replay" Submitted on Jun. 2019, arXiv:1906.03710v1, 14 pages.
Liu et al., "Sequence modeling of temporal credit assignment for episodic reinforcement learning" Submitted on May 2019, arXiv:1905.13420v1, 15 pages.
Mnih et al., "Human-level control through deep reinforcement learning" Nature, 518, Feb. 2015, (7540):529-533.
Munos et al., "Safe and efficient off-policy reinforcement learning" Submitted on Jun. 2016, arXiv:1606.02647v1, 17 pages.
Osband et al., "Deep exploration via bootstrapped dqn" In Advances in Neural Information Processing Systems, 2016, 9 pages.
Osband et al., "Randomized prior functions for deep reinforcement learning" Advances in Neural Information Processing Systems 31, 13 pages.
Ostrovski et al., "Count-based exploration with neural density models" In Proceedings of the 34th International Conference on Machine Learning—vol. 70, Jul. 2017, 10 pages.
Oudeyer et al. "Intrinsic motivation systems for autonomous mental development" IEEE transactions on evolutionary computation, Apr. 2007, 11(2):265-286.

(56) References Cited

OTHER PUBLICATIONS

Plappert et al., "Parameter space noise for exploration" Submitted on Jun. 2017, arXiv:1706.01905v1, 17 pages.
Pohlen et al., "Observe and look further: Achieving consistent performance on atari" Submitted on May 2018, arXiv:1805.11593v1, 19 pages.
Puterman, "Chapter 8 : Markov decision processes" Handbooks in operations research and management science, 1990, 2:331-434.
Salimans et al., "Evolution strategies as a scalable alternative to reinforcement learning" Submitted on Mar. 2017, arXiv:1703.03864v1, 12 pages.
Savinov et al., "Episodic curiosity through reachability" Submitted on Oct. 2018, arXiv:1810.02274v1, 16 pages.
Schaul et al., "Adapting behaviour for learning progress" Submitted on Dec. 2019, arXiv:1912.06910v1, 23 pages.
Schaul et al., "Prioritized experience replay" Submitted on Feb. 2016, arXiv:1511.05952v4, 21 pages.
Schmidhuber, "A possibility for implementing curiosity and boredom in model- building neural controllers" in From Animals to Animats: Proceedings of the First International Conference on Simulation of Adaptive Behavior, MIT Press, 1991, 222-227.
Schrittwieser et al., "Mastering atari, go, chess and shogi by planning with a learned model" Submitted on Feb. 2020, arXiv:1911.08265v2, 21 pages.
Silver et al., "Mastering the game of go with deep neural networks and tree search" nature, Jan. 2016, 529(7587):484-489.
Tang et al., "#Exploration: A study of count-based exploration for deep reinforcement learning" In Advances in neural information processing systems 30, 2017, 10 pages.
Toromanoff et al., "Is deep reinforcement learning really superhuman on atari?" Submitted on Aug. 2019, arXiv:1908.04683v1, 20 pages.
Vinyals et al., "Grandmaster level in StarCraft II using multi-agent reinforcement learning" Nature 575.7782, Nov. 2019, 350-354.
Weber et al., "Credit assignment techniques in stochastic computation graphs" Submitted on Jan. 2019, arXiv:1901.01761v1, 40 pages.
Xu et al., "Meta-gradient reinforcement learning" Advances in neural information processing systems 31, 2018, 12 pages.
Zhang et al., "Scheduled intrinsic drive: A hierarchical take on intrinsically motivated exploration" Submitted on Jun. 2019, arXiv:1903.07400v2, 18 pages.
Office Action in Japanese Appln. No. 2022-548005, dated Mar. 4, 2024, 5 pages (with English translation).
Office Action in Korean Appln. No. 10-2022-7030755, mailed on Aug. 18, 2025, 20 pages (with English translation).
Office Action in Chinese Appln. No. 202180021105.3, mailed on Dec. 11, 2025, 16 pages (with English translation).
Notice of Allowance in Korean Appln. No. 10-2022-7030755, mailed on Jun. 26, 2026, 5 pages (with English translation).

* cited by examiner

TRAINING SYSTEM 200

INTRINSIC REWARD SYSTEM 300

REINFORCEMENT LEARNING WITH ADAPTIVE RETURN COMPUTATION SCHEMES

CROSS-REFERENCE TO RELATED APPLICATION

This application is a National Stage Application under 35 U.S.C. § 371 and claims the benefit of International Application No. PCT/EP2021/052988, filed Feb. 8, 2021, which claims priority to U.S. Application No. 62/971,890, filed Feb. 7, 2020, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations for training a set of one or more action selection neural networks for controlling an agent that is interacting with an environment.

Particular embodiments of the subject matter described in this specification can be implemented so as to realize one or more of the following advantages.

The system described in this specification maintains a policy that the system uses to select the most appropriate return computation scheme to use for any given task episode that is performed during training of a set of one or more action selection neural network(s) that are used to control an agent interacting with an environment in order to perform a task. Each possible return computation scheme assigns a different importance to exploring the environment while the agent interacts with the environment. In particular, each possible return compensation scheme specifies a discount factor to be used in computing returns, an intrinsic reward scaling factor used in computing overall rewards, or both. More specifically, the system uses an adaptive mechanism to adjust the policy throughout the training process, resulting in different return computation schemes being more likely to be selected at different points during the training. Using this adaptive mechanism allows the system to effectively select the most appropriate time horizon for computing returns, the most appropriate degree of exploration, or both at any given time during training. This results in trained neural networks that can exhibit improved performance when controlling an agent to perform any of a variety of tasks.

Additionally, in some implementations, the system makes use of two separate neural networks to estimate the "value" of any given action: an extrinsic return action selection neural network that is trained using only extrinsic rewards and an intrinsic return action selection neural network that is trained using only intrinsic rewards. This novel parameterization of the architecture allows for more consistent and stable learning, decreasing the training time and amount of computational resources required for training as well as improving the performance of the resulting trained neural networks. In particular, these two neural networks can be trained on the same trajectories (but using different types of rewards from the trajectories) and therefore can achieve the increased consistency and stability without an accompanying decrease in data efficiency.

Compared to conventional systems, the system described in this specification may consume fewer computational resources (e.g., memory and computing power) by training the action selection neural network(s) to achieve an acceptable level of performance over fewer training iterations. Moreover, a set of one or more action selection neural networks trained by the system described in this specification can select actions that enable the agent to accomplish tasks more effectively (e.g., more quickly) than an action selection neural network trained by an alternative system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
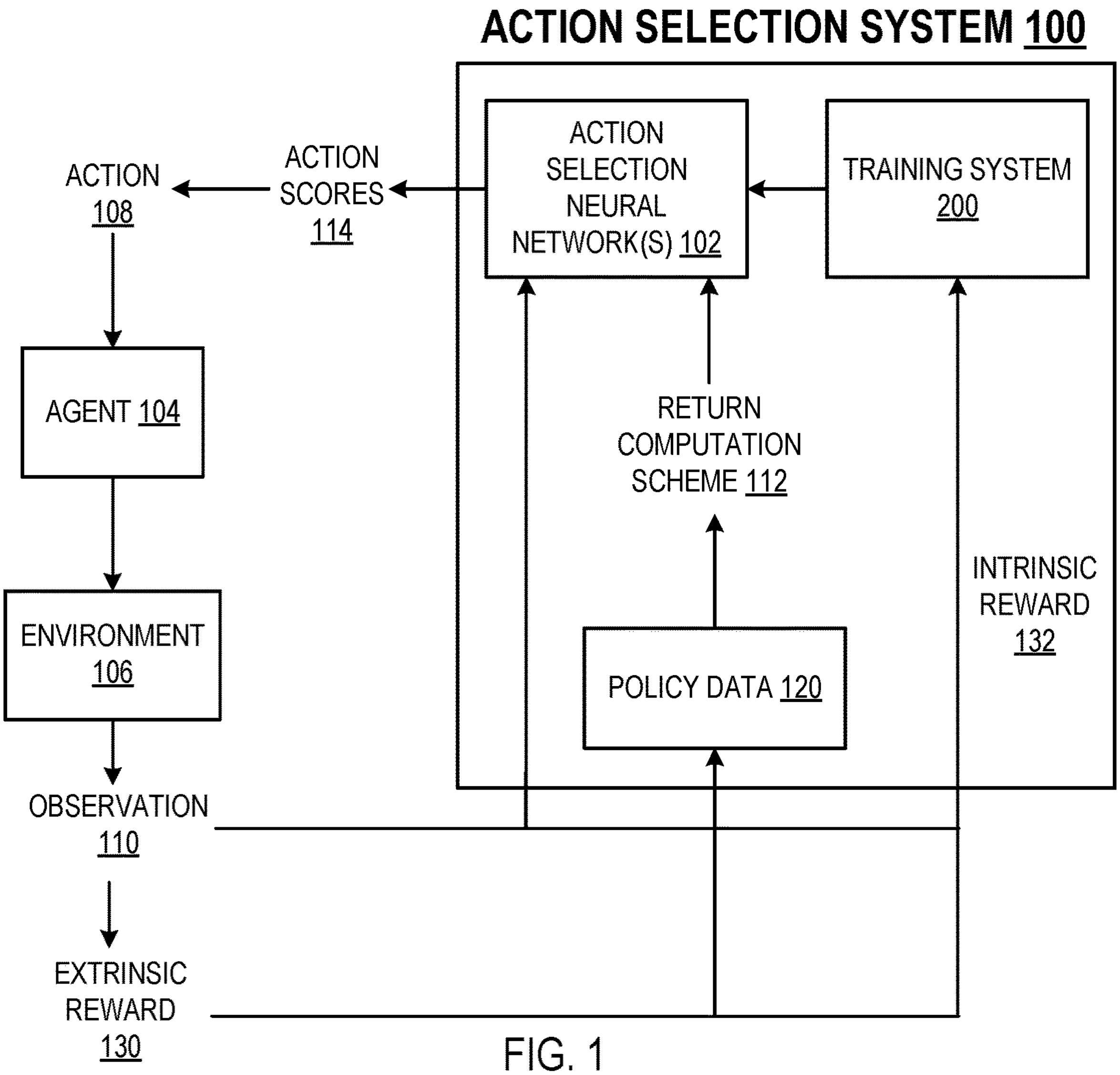
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 uses one or more action selection neural network(s) 102 and policy data 120 to control an agent 104 interacting with an environment 106 to accomplish a task by selecting actions 108 to be performed by the agent 104 at each of multiple time steps during the performance of an episode of the task.

An "episode" of a task is a sequence of interactions during which the agent attempts to perform an instance of the task starting from some starting state of the environment. In other words, each task episode begins with the environment being in an initial state, e.g., a fixed initial state or a randomly selected initial state, and ends when the agent has successfully completed the task or when some termination criterion is satisfied, e.g., the environment enters a state that has been designated as a terminal state or the agent performs a threshold number of actions without successfully completing the task.

At each time step during any given task episode, the system 100 receives an observation 110 characterizing the current state of the environment 106 at the time step and, in response, selects an action 108 to be performed by the agent 104 at the time step. After the agent performs the action 108, the environment 106 transitions into a new state and the system 100 receives an extrinsic reward 130 from the environment 106.

Generally, the extrinsic reward 130 is a scalar numerical value and characterizes a progress of the agent 104 towards completing the task.

As a particular example, the extrinsic reward 130 can be a sparse binary reward that is zero unless the task is successfully completed and one if the task is successfully completed as a result of the action performed.

As another particular example, the extrinsic reward 130 can be a dense reward that measures a progress of the agent towards completing the task as determined based on individual observations received during the episode of attempting to perform the task, i.e., so that non-zero rewards can be and frequently are received before the task is successfully completed.

While performing any given task episode, the system 100 selects actions in order to attempt to maximize a return that is received over the course of the task episode.

That is, each at time step during the episode, the system 100 selects actions that attempt to maximize the return that will be received for the remainder of the task episode starting from the time step.

Generally, at any given time step, the return that will be received is a combination of the rewards that will be received at time steps that are after the given time step in the episode.

For example, at a time step t, the return can satisfy:

$$\Sigma_i \gamma^{i-t-1} r_i,$$

where i ranges either over all of the time steps after t in the episode or for some fixed number of time steps after t within the episode, $\gamma$ is a discount factor, and $r_i$ is an overall reward at time step i. As can be seen from the above equation, higher values of the discount factor result in a longer time horizon for the return calculation, i.e., result in rewards from more temporally distant time steps from the time step t being given more weight in the return computation.

In some implementations, the overall reward for a given time step is equal to the extrinsic reward received at the time step, i.e., received as a result of the action performed at the preceding time step.

In some other implementations, the system 100 also obtains, i.e., receives or generates, an intrinsic reward 132 from at least the observation received at the time step. The intrinsic reward 132 characterizes a progress of the agent towards exploring the environment as of the time step in a manner that is independent of the task being performed, i.e., instead of, like the extrinsic reward 130, characterizing the progress of the agent towards completing the task as of the time step. That is, the intrinsic reward 132 measures exploration of the environment rather than measuring the performance of the agent on the task. For example, the intrinsic reward may be a value indicative of an extent to which the observations provide information about the whole environment and/or the possible configurations of objects within it; for example, if the environment is a real-world environment and the observations are images (or other sensor data) relating to corresponding parts of the environment, the intrinsic reward may be a value indicative of how much of the environment has appeared in at least one of the images. Computing an intrinsic reward for a time step will be described in more detail below with reference to FIGS. 2 and 3.

In these implementations, the system 100 can determine the "overall" reward received by the agent at a time step based at least on: (i) the extrinsic reward for the time step, (ii) the intrinsic reward for the time step, and (iii) an intrinsic reward scaling factor.

As a particular example, the system 100 can generate the overall reward $r_t$ for the time step t, e.g., as:

$$r_t = r_t^{task} + \beta \cdot r_t^{exploration}$$

where $$r_t^{task}$$

denotes the extrinsic reward for the time step, $$r_t^{exploration}$$

denotes the intrinsic reward for the time step, and $\beta$ denotes the intrinsic reward scaling factor. It can be appreciated that the value of the intrinsic reward scaling factor controls the relative importance of the extrinsic reward and the intrinsic reward to the overall reward, e.g., such that a higher value of the intrinsic reward scaling factor increases the contribution of the intrinsic reward to the overall reward. Other methods for determining the overall reward from the extrinsic reward, the intrinsic reward, and the intrinsic reward scaling factor in which the value of the intrinsic reward scaling factor controls the relative importance of the extrinsic reward and the intrinsic reward to the overall reward are possible, and the above equation is provided for illustrative purposes only.

The policy data 120 is data specifying a policy for selecting between multiple different return computation schemes from a set of return computation schemes.

Each return computation scheme in the set assigns a different importance to exploring the environment while performing the episode of the task. In other words, some return computation schemes in the set assign more importance to exploring the environment, i.e., collecting new information about the environment, while other return computation schemes in the set assign more importance to exploiting the environment, i.e., exploiting current knowledge about the environment.

As one particular example, each return computation scheme can specify at least a respective discount factor $\gamma$ that is used in combining rewards to generate returns. In other words, some return computation schemes can specify relatively larger discount factors, i.e., discount factors that result in rewards at future time steps being weighted relatively more heavily in the return computation for a current time step, than other return computation schemes.

As another particular example, each return computation scheme can specify at least a respective intrinsic reward scaling factor $\beta$ that defines an importance of the intrinsic reward relative to the extrinsic reward that is received from the environment when generating returns.

In particular, as described above, the intrinsic reward scaling factor defines how much the intrinsic reward for a given time step is scaled before being added to the extrinsic reward for the given time step to generate an overall reward for the time step. In other words, some return computation schemes can specify relative larger intrinsic reward scaling factors, i.e., scaling factors that result in the intrinsic reward at the time step being assigned a relatively larger weight in the calculation of the overall return at the time step, than other return computation schemes.

As another particular example, each return computation scheme can specify a respective discount factor—intrinsic reward scaling factor pair, i.e. a γ-β pair, so that each scheme in the set specifies a different combination of values for the discount factor and the scaling factor from each other set in the scheme.

Before performing the episode, the system 100 selects a return computation scheme from the multiple different schemes in the set using the policy currently specified by the policy data 120. For example, the system 100 can select a scheme based on reward scores assigned to the schemes by the policy. Selecting a scheme is described in more detail below with reference to FIG. 4. As will be described in more detail below, the policy is adaptively modified during training so that different schemes become more likely to be selected at different times during the training.

The system 100 then controls the agent 104 to perform the task episode in accordance with the selected scheme, i.e., to maximize returns computed using the selected scheme, using the one or more action selection neural network(s) 102.

To do so, at each time step in the episode, the system 100 processes, using the action selection neural network(s) 102, an input including: (i) an observation 110 characterizing the current state of the environment at the time step, and (ii) selected scheme data specifying the selected return computation scheme 112 to generate action scores 114. The selected scheme data can specify the selected scheme 112 in any appropriate way, e.g., as a learned embedding or as a one-hot vector that has a value of "1" at the position corresponding to the selected scheme and values of "0" at positions corresponding to all other schemes in the set.

The action scores 114 (also referred to as "return estimates") can include a respective numerical value for each action in a set of possible actions and are used by the system 100 to select the action 108 to be performed by the agent 104 at the time step.

The action selection neural network(s) 102 can be understood as implementing a family of action selection policies that are indexed by the possible return computation schemes in the set. In particular, a training system 200 (which will be described in more detail with reference to FIG. 2) can train the action selection neural network(s) 102 such that the selected return computation scheme characterizes the degree to which the corresponding action selection policy is "exploratory", i.e., selects actions that cause the agent to explore the environment. In other words, the training system 200 trains the action selection neural network(s) 102 such that conditioning the neural network(s) on the selected scheme causes the network(s) to generate outputs that define action selection policies that place more or less emphasis on exploring versus exploiting the environment depending on which scheme was selected.

In some implementations, the one or more action selection neural networks 102 are a single neural network that receives the input that includes the observation 110 and the data specifying the selected return computation scheme 112 and generates as output the action scores 114. That is, in these implementations the action scores 114 are the outputs of a single action selection neural network 102.

The action selection neural network 102 can be implemented with any appropriate neural network architecture that enables it to perform its described function. In one example, the action selection neural network 102 may include an "embedding" sub-network, a "core" sub-network, and a "selection" sub-network. A sub-network of a neural network refers to a group of one or more neural network layers in the neural network. When the observations are images, the embedding sub-network can be a convolutional sub-network, i.e., that includes one or more convolutional neural network layers, that is configured to process the observation for a time step. When the observations are lower-dimensional data, the embedding sub-network can be a fully-connected sub-network. The core sub-network can be a recurrent sub-network, e.g., that includes one or more long short-term memory (LSTM) neural network layers, that is configured to process: (i) the output of the embedding sub-network, (ii) the selected scheme data representing the selected return computation scheme and, optionally, (iii) data specifying the most recently received extrinsic (and optionally intrinsic) rewards and/or the most recently performed action. The selection sub-network can be configured to process the output of the core sub-network to generate the action scores 114.

In some other implementations, the one or more action selection neural network(s) 102 are two separate neural networks: (i) an intrinsic reward action selection neural network that estimates intrinsic returns computed only from intrinsic rewards generated by an intrinsic reward system based on observations received during interactions with the environment; and (ii) an extrinsic reward action selection neural network that estimates extrinsic returns computed only from extrinsic rewards received from the environment as a result of interactions with the environment.

In these implementations, the two separate neural networks can have the same architecture, but different parameter values as a result of being trained to estimate different quantities, i.e., as a result of the intrinsic reward action selection neural network being trained to estimate intrinsic returns and the extrinsic reward action selection neural network being trained to estimate extrinsic returns.

In these implementations, the system 100 processes the input using the intrinsic reward action selection neural network to generate a respective intrinsic action score ("estimated intrinsic return") for each action and processes the input using the extrinsic reward action selection neural network to generate a respective extrinsic action score ("estimated extrinsic return") for each action.

The system 100 can then combine the intrinsic action score and the extrinsic action score for each action in accordance with the intrinsic reward scaling factor to generate the final action score ("final return estimate") for the action.

As one example, the final action score $Q(x,a,j;\theta)$ for an action a in response to an observation x given that the j-th scheme was selected can satisfy:

$$Q(x,a,j;\theta)=Q(x,a,j;\theta^e)+\beta_j Q(x,a,j;\theta^i),$$

where $Q(x,a,j;\theta^e)$ is the extrinsic action score for action a, $Q(x,a,j;\theta^i)$ is the intrinsic action score for action a, and $\beta_j$ is the scaling factor in the j-th scheme.

As another example, the final action score $Q(x,a,j;\theta)$ can satisfy:

$$Q(x,a,j;\theta)=h(h^{-1}(Q(x,a,j;\theta^e))+\beta_j h^{-1}(x,a,j;\theta^i)),$$

where h is a monotonically increasing and invertible squashing function that scales the state-action value function, i.e., the extrinsic and intrinsic reward functions, to make it easier to approximate for a neural network.

Thus, different values of $\beta_j$ in the return scheme cause the predictions of the intrinsic action selection neural network to be weighted differently when computing the final action score.

The system 100 can use the action scores 114 to select the action 108 to be performed by the agent 104 at the time step. For example, the system 100 may process the action scores 114 to generate a probability distribution over the set of possible actions, and then select the action 108 to be performed by the agent 104 by sampling an action in accordance with the probability distribution. The system 100 can generate the probability distribution over the set of possible actions, e.g., by processing the action scores 114 using a soft-max function. As another example, the system 100 may select the action 108 to be performed by the agent 104 as the possible action that is associated with the highest action score 114. Optionally, the system 100 may select the action 108 to be performed by the agent 104 at the time step using an exploration policy, e.g., an ∈-greedy exploration policy in which the system 100 selects the action with the highest final return estimate with probability 1-ε and selecting a random action from the set of actions with probability ε.

Once the task episode has been performed, i.e., once the agent successfully performs the task or once some termination criterion for the task episode has been satisfied, the system 100 can use the results of the task episode to (i) update the policy for selecting between return computation schemes that is currently specified by the policy data 120, (ii) train the action selection neural network(s) 102, or both.

More generally, both the policy specified by the policy data 120 and the parameter values of the action selection neural network(s) 102 are updated during training based on trajectories generated as a result of interactions of the agent 104 with the environment.

In particular, during training, the system 100 updates the return scheme selection policy using recently generated trajectories, e.g., trajectories generated within a sliding window of a fixed size of the most recently generated trajectory. By using this adaptive mechanism to adjust the return computation scheme selection policy throughout the training process, different return computation schemes are more likely to be selected at different points during the training of the action selection neural network(s). Using this adaptive mechanism allows the system 100 to effectively select the most appropriate time horizon, the most appropriate degree of exploration, or both at any given time during the training. This results in trained neural network(s) that can exhibit improved performance when controlling the agent to perform any of a variety of tasks.

Updating the return scheme selection policy is described in more detail below with reference to FIG. 4.

The system 100 trains the action selection neural network(s) 102 using trajectories that are generated by the system 100 and added to a data store referred to as a replay buffer. In other words, at specified intervals during training, the system 100 samples trajectories from the replay buffer and uses the trajectories to trajectories to train the neural network(s) 102. In some implementations, the trajectories used to update the return scheme selection policy are also added to the replay buffer for later use in training the neural network(s) 102. In other implementations, trajectories used to update the return scheme selection policy are not added to the replay buffer and are only used for updating the policy. For example, the system 100 may alternate between performing task episodes that will be used to update the policy and performing task episodes that will be added to the replay buffer.

Training the action selection neural network(s) is described below with reference to FIG. 2.

In some implementations, the environment is a real-world environment and the agent is a mechanical agent interacting with the real-world environment, e.g. moving within the real-world environment (by translation and/or rotation in the environment, and/or changing its configuration) and/or modifying the real-world environment. For example, the agent can be a robot interacting with the environment, e.g., to locate an object of interest in the environment, to move an object of interest to a specified location in the environment, to physically manipulate an object of interest in the environment, or to navigate to a specified destination in the environment; or the agent can be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations can be defined in 1, 2 or 3 dimensions, and can be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions can be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment can be a simulation of a robot or vehicle and the action selection network can be trained on the simulation. For example, the simulated environment can be a motion simulation environment, e.g., a driving simulation or a flight simulation, and the agent can be a simulated vehicle navigating through the motion simulation. In these implementations, the actions can be control inputs to control the simulated user or simulated vehicle.

In another example, the simulated environment can be a video game and the agent can be a simulated user playing the video game.

In a further example the environment can be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent can be a mechanical agent that performs or controls the protein folding actions selected by the system automatically without human interaction. The observations may include direct or indirect observations of a state of the protein and/or can be derived from simulation.

Generally in the case of a simulated environment the observations may include simulated versions of one or more of the previously described observations or types of observations and the actions may include simulated versions of one or more of the previously described actions or types of actions.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

Optionally, in any of the above implementations, the observation at any given time step may include data from a previous time step that can be beneficial in characterizing the environment, e.g., the action performed at the previous time step, the reward received in response to be performed at the previous time step, and so on.

The training system 200 can determine a reward received by the agent 104 at each time step, and may train the action selection neural network(s) 102 using reinforcement learning techniques to optimize a cumulative measure of rewards received by the agent. The reward received by the agent can be represented, e.g., by a scalar numerical value. The training system 200 can determine the reward received by the agent at each time step based at least in part on the intrinsic reward scaling factor 112 processed by the action selection neural network(s) 102 at the time step. In particular, the value of the intrinsic reward scaling factor 112 can determine the extent to which exploration of the environment 106 contributes to the reward received by the agent. In this manner, the training system 200 may train the action selection neural network(s) 102 such that, for higher values of the intrinsic reward scaling factor 112, the action selection neural network(s) 102 selects actions that cause the agent to explore the environment more rapidly.

Figure 2:
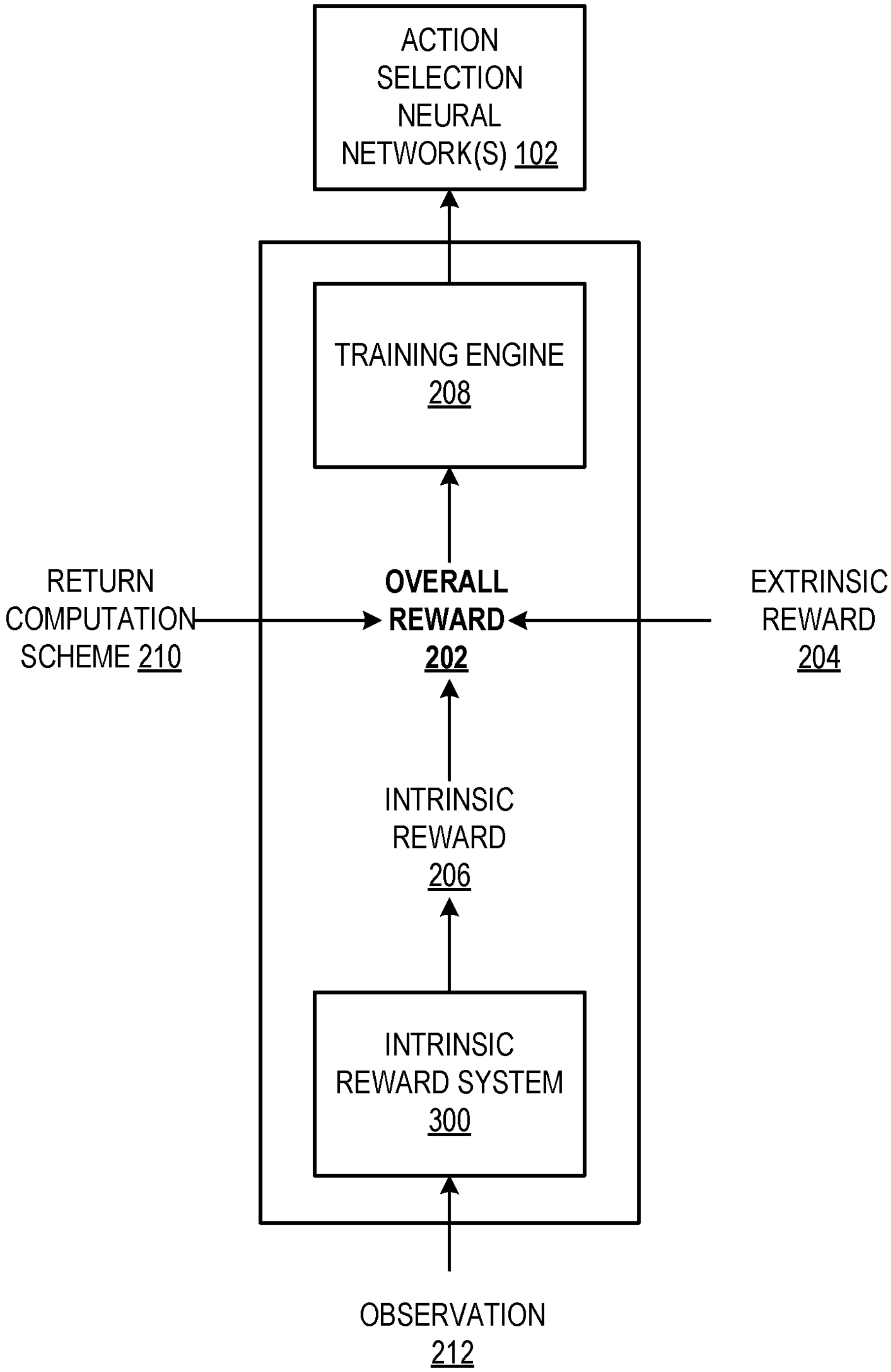
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 is configured to train the action selection neural network(s) 102 (as described with reference to FIG. 1) to optimize a cumulative measure of overall rewards received by an agent by performing actions that are selected using the action selection neural network(s) 102.

As described above, the training system 200 can determine the "overall" reward 202 received by the agent at a time step based at least on: (i) an "extrinsic" reward 204 for the time step, (ii) an "exploration" reward 206 for the time step, and (iii) an intrinsic reward scaling factor specified by the return computation scheme 210 that was sampled for the episode to which the time step belongs.

As described above, the intrinsic reward 206 may characterize a progress of the agent towards exploring the environment at the time step. For example, the training system 200 can determine the intrinsic reward 206 for the time step based on a similarity measure between: (i) an embedding of an observation 212 characterizing the state of the environment at the time step, and (ii) embeddings of one or more previous observations characterizing states of the environment at respective previous time steps. In particular, a lower similarity between the embedding of the observation at the time step and the embeddings of observations at previous time steps may indicate that the agent is exploring a previously unseen aspect of the environment and therefore result in a higher intrinsic reward 206. The training system 200 can generate the intrinsic reward 206 for the time step by processing the observation 212 characterizing the state of the environment at the time step using an intrinsic reward system 300, which will be described in more detail with reference to FIG. 3.

To train the action selection neural network(s) 102, the training system 200 obtains a "trajectory" characterizing interaction of the agent with the environment over one or more (successive) time steps during a task episode. In particular, the trajectory may specify for each time step: (i) the observation 212 characterizing the state of the environment at the time step, (ii) the intrinsic reward 202 for the time step, and (iii) the extrinsic reward for the time step. The trajectory also specifies the return computation scheme corresponding to the trajectory, i.e., that was used to select the actions performed by the agent during the task episode.

When there is a single action selection neural network, a training engine 208 can thereafter train the action selection neural network(s) 102 by computing respective overall rewards for each time step from the intrinsic reward for the time step, the extrinsic reward for the time step, and an intrinsic reward scaling factor as described above, i.e., either a constant intrinsic reward scaling factor or, if different return computation schemes specify different intrinsic reward scaling factors, the intrinsic reward scaling factor specified by the return computation scheme corresponding to the trajectory.

The training engine 208 can then train the action selection neural network on the trajectory using a reinforcement learning technique. The reinforcement learning technique can be, e.g., a Q-learning technique, e.g., a Retrace Q-learning technique or a Retrace Q-learning technique with a transformed Bellman operator, such that the action selection neural network is a Q neural network and the action scores are Q values that estimate expected returns that would be received if the corresponding actions were performed by the agent.

Generally, the reinforcement learning technique uses discount factors for rewards received at future time steps in the trajectory, estimates of future returns to be received after any given time step, or both to compute target outputs for the training of the action selection neural network. When training on the trajectory, the system 200 uses the discount factor in the return compensation scheme corresponding to the trajectory. This results in the action selection neural network being trained to generate action scores that weight future rewards differently when conditioned on different discount factors.

When there are two action selection neural networks 102, the training engine 208 can train the two action selection neural networks 102 separately on the same trajectory, i.e., instead of computing overall rewards for the time steps in the trajectory. More specifically, the training engine 208 can train the intrinsic reward action selection neural network using the reinforcement learning technique, but using only the intrinsic rewards for the time steps in the trajectory. The training engine 208 can also train the extrinsic reward action selection neural network using the reinforcement learning technique, but using only the extrinsic rewards for the time steps in the trajectory.

For the training of both neural networks, the training engine 208 can use the same "target" policy for the training, i.e., a policy that selects the action that maximizes the overall reward computed using the scaling factor in the corresponding return computation scheme 210. Similarly, and as described above, when training on the trajectory, the system 200 uses the discount factor in the return compensation scheme corresponding to the trajectory. This results in the action selection neural networks being trained to generate action scores that weight future rewards differently when conditioned on different discount factors.

In so doing, the system 200 trains the intrinsic reward action selection neural network to generate intrinsic action scores ("estimated intrinsic returns") that are estimates of the intrinsic returns that would be received if the corresponding actions were performed by the agent while training the extrinsic reward action selection neural network to generate extrinsic action scores ("estimated extrinsic returns") that are estimates of the extrinsic returns that would be received if the corresponding actions were performed by the agent.

In some implementations, during the training, the system 100 can generate trajectories for use by the training system 200 in training the action selection neural network(s) 102 using multiple actor computing units. In some of these implementations, each actor computing unit maintains and separately updates a policy for selecting between multiple different return computation schemes. This can be beneficial when different actor computing units use different values of c in 6-greedy control or otherwise differently control the agent. In some other implementations, the system can maintain a central policy that is the same for all of the actor computing units.

When multiple actor computing units are used, each actor computing unit can repeatedly perform the operations described above with reference to FIG. 1 to control an instance of an agent to perform a task episode and use the results of the interactions of the agent during the task episodes to update the return computation scheme selection policy, i.e., either the central policy or the policy separately maintained by the actor computing unit, and to generate training data for training the action selection neural network(s).

A computing unit can be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units can be different types of computing units. For example, one computing unit can be a CPU while other computing units can be GPUs.

The training system 200 stores trajectories generated by each actor computing unit in a data store referred to as a replay buffer, and at each of multiple training iterations, samples a batch of trajectories from the replay buffer for use in training the action selection neural network(s) 102. The training system 200 can sample trajectories from the replay buffer in accordance with a prioritized experience replay algorithm, e.g., by assigning a respective score to each stored trajectory, and sampling trajectories in accordance with the scores. An example prioritized experience replay algorithm is described in T. Schaul et al., "Prioritized experience replay," arXiv:1511.05952v4 (2016).

The set of possible intrinsic reward scaling factors $$\{\beta_i\}_{i=0}^{N-1}$$

(i.e., where N is the number of possible intrinsic reward scaling factors) included in the return computation schemes in the set can include a "baseline" intrinsic reward scaling factor (substantially zero) that renders the overall reward independent of the intrinsic reward.

The other possible intrinsic reward scaling factors can be respective positive numbers (typically all different from each of the others), and can be considered as causing the action selection neural network to implement a respective "exploratory" action selection policy. The exploratory action selection policy, to an extent defined by the corresponding intrinsic reward scaling factor, encourages the agent not only to solve its task but also to explore the environment.

The action selection neural network(s) 102 can use the information provided by the exploratory action selection policies to learn a more effective exploitative action selection policy. The information provided by the exploratory policies may include, e.g., information stored in the shared weights of the action selection neural network(s). By jointly learning a range of action selection policies, the training system 200 may enable the action selection neural network(s) 102 to learn each individual action selection policy more efficiently, e.g., over fewer training iterations. Moreover, learning the exploratory policies enables the system to continually train the action selection neural network even if the extrinsic rewards are sparse, e.g., rarely non-zero.

After the training of the action selection neural network(s) is completed, the system 100 can either continue updating the scheme selection policy and selecting schemes as described above or fix the scheme selection policy and control the agent by greedily selecting the scheme that the scheme selection policy indicates has the highest reward score.

Generally, the system can use any kind of reward that characterizes exploration progress rather than task progress as the intrinsic reward. One particular example of an intrinsic reward and a description of a system that generates the intrinsic rewards is described below with reference to FIG. 3.

Figure 3:
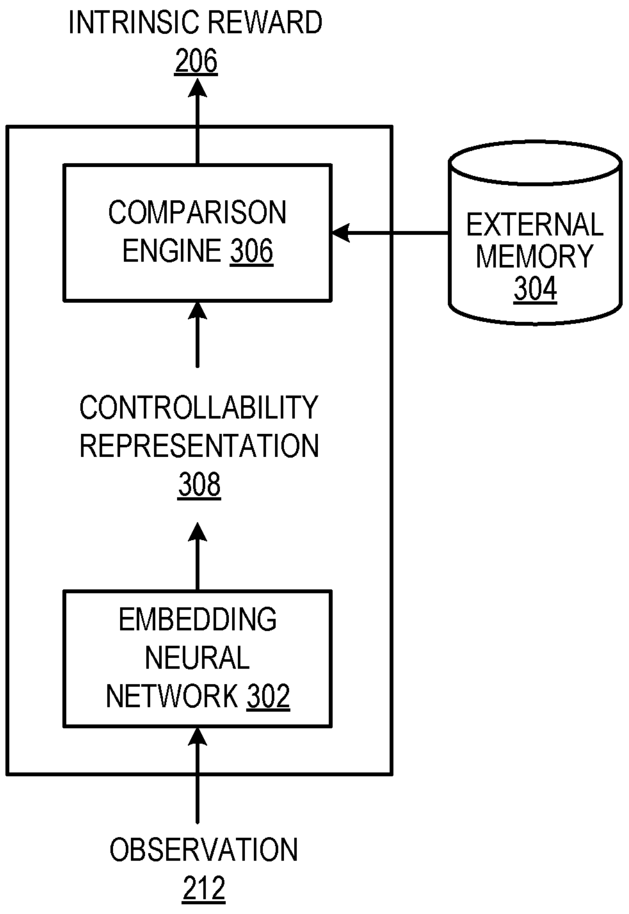
FIG. 3 shows an example intrinsic reward system.

FIG. 3 shows an example intrinsic reward system 300. The intrinsic reward system 300 is an example of a system implemented as computer programs on one or more computers in one or more locations in which the systems, components, and techniques described below are implemented.

The intrinsic reward system 300 is configured to process a current observation 212 characterizing a current state of the environment to generate an intrinsic reward 206 that characterizes the progress of the agent in exploring the environment. The intrinsic rewards 206 generated by the system 300 can be used, e.g., by the training system 200 described with reference to FIG. 2.

The system 300 includes an embedding neural network 302, an external memory 304, and a comparison engine 306, each of which will be described in more detail next.

The embedding neural network 302 is configured to process the current observation 212 to generate an embedding of the current observation, referred to as a "controllability representation" 308 (or an "embedded controllability representation"). The controllability representation 308 of the current observation 212 can be represented as an ordered collection of numerical values, e.g., an array of numerical values. The embedding neural network 302 can be implemented as a neural network having multiple layers, with one or more of the layers performing a function which is defined by weights which are modified during the training of the embedding neural network 302. In some cases, particularly when the current observation is in the form of at least one image, one or more of the layers, e.g. at least the first layer, of the embedding neural network can be implemented as a convolutional layer.

The system 300 may train the embedding neural network 302 to generate controllability representations of observations that characterize aspects of the state of the environment that are controllable by the agent. An aspect of the state of the environment can be referred to as controllable by the agent if it is (at least partially) determined by the actions performed by the agent. For example, the position of an object being gripped by an actuator of a robotic agent can be controllable by the agent, whereas the ambient lighting conditions or the movement of other agents in the environment may not be controllable by the agent. Example techniques for training the embedding neural network 302 are described in more detail below.

The external memory 304 stores controllability representations of previous observations characterizing states of the environment at previous time steps.

The comparison engine 306 is configured to generate the intrinsic reward 206 by comparing the controllability representation 308 of the current observation 212 to controllability representations of previous observations that are stored in the external memory 304. Generally, the comparison engine 306 can generate a higher intrinsic reward 206 if the controllability representation 308 of the current observation 212 is less similar to the controllability representations of previous observations that are stored in the external memory.

For example, the comparison engine 306 can generate the intrinsic reward $r_t$ as:

$$r_t = \left(\sqrt{\sum_{f_i \in N_k} K(f(x_t), f_i)} + c\right)^{-1} \quad (2)$$

where $$N_k = \{f_i\}_{i=1}^{k}$$

denotes the set of k controllability representations $f_i$ in the external memory 304 having the highest similarity (e.g., by a Euclidean similarity measure) to the controllability representation 308 of the current observation 212 (where k is a predefined positive integer value, which is typically greater than one), $f(x_t)$ denotes the controllability representation 308 of the current observation 212 denoted $x_t$, $K(\cdot,\cdot)$ is a "kernel" function, and c is a predefined constant value (e.g., c=0.001) that is used to encourage numerical stability. The kernel function $K(\cdot,\cdot)$ can be given by, e.g.:

$$K(f(x_t), f_i) = \frac{\epsilon}{\frac{d^2(f(x_t), f_i)}{d_m^2} + \epsilon} \quad (3)$$

where $d(f(x_t),f_i)$ denotes a Euclidean distance between the controllabilitry representations $f(x_t)$ and $f_i$, $\epsilon$ denotes a predefined constant value that is used to encourage numerical stability, and $$d_m^2$$

denotes a running average (i.e., over multiple time steps, such as a fixed plural number of time steps) of the average squared Euclidean distance between: (i) the controllability representation of the observation at the time step, and (ii) the controllability representations of the k most similar controllability representations from the external memory. Other techniques for generating the intrinsic reward 206 that result in a higher intrinsic reward 206 if the controllability representation 308 of the current observation 212 is less similar to the controllability representations of previous observations that are stored in the external memory are possible, and equations (2)-(3) are provided for illustrative purposes only.

Determining the intrinsic rewards 206 based on controllability representations that characterize controllable aspects of the state of the environment may enable more effective training of the action selection neural network. For example, the state of the environment may vary independently of the actions performed by the agent, e.g., in the case of a real-world environment with variations in lighting and the presence of distractor objects. In particular, an observation characterizing the current state of the environment may differ substantially from an observation characterizing a previous state of the environment, even if the agent has performed no actions in the intervening time steps. Therefore, an agent that is trained to maximize intrinsic rewards determined by directly comparing observations characterizing states of the environment may not perform meaningful exploration of the environment, e.g., because the agent may receive positive intrinsic rewards even without performing any actions. In contrast, the system 300 generates intrinsic rewards that incentivize the agent to achieve meaningful exploration of controllable aspects of the environment.

In addition to using the controllability representation 308 of the current observation 212 to generate the intrinsic reward 206 for the current time step, the system 300 may store the controllability representation 308 of the current observation 212 in the external memory 304.

In some implementations, the external memory 304 can be an "episodic" memory, i.e., such that the system 300 "resets" the external memory (e.g., by erasing its contents) each time a memory resetting criterion is satisfied. For example, the system 300 can determine that the memory resetting criterion is satisfied at the current time step if it was last satisfied a predefined number of time steps N>1 before the current time step, or if the agent accomplishes its task at the current time step. In implementations where the external memory 304 is an episodic memory, the intrinsic reward 206 generated by the comparison engine 306 can be referred to as an "episodic" intrinsic reward. Episodic intrinsic rewards may encourage the agent to continually explore the environment by performing actions that cause the state of the environment to repeatedly transition into each possible state.

In addition to determining an episodic intrinsic reward, the system 300 may also determine a "non-episodic" intrinsic reward, i.e., that depends on the state of the environment at every previous time step, rather than just those time steps since the last time the episodic memory was reset. The non-episodic intrinsic reward can be, e.g., a random network distillation (RND) reward as described with reference to: Y. Burda et al.: "Exploration by random network distillation," arXiv:1810.12894v1 (2018). Non-episodic intrinsic rewards may diminish over time as the agent explores the environment and do not encourage the agent to repeatedly revisit all possible states of the environment.

Optionally, the system 300 can generate the intrinsic reward 206 for the current time step based on both an episodic reward and a non-episodic reward. For example, the system 300 can generate the intrinsic reward $R_t$ for the time step as:

$$R_t = r_t^{episodic} \cdot \min\{\max\{r_t^{non\text{-}episodic}, 1\}, L\} \tag{4}$$

where $$r_t^{episodic}$$

denotes the episodic reward, e.g., generated by the comparison engine 306 using an episodic external memory 304, and $$r_t^{non\text{-}episodic}$$

denotes the non-episodic reward, e.g., a random network distillation (RND) reward, where the value of the non-episodic reward is clipped the predefined range [1,L], where L>1.

A few example techniques for training the embedding neural network 302 are described in more detail next.

In one example, the system 300 can jointly train the embedding neural network 302 with an action prediction neural network. The action prediction neural network can be configured to receive an input including respective controllability representations (generated by the embedding neural network) of: (i) a first observation characterizing the state of the environment at a first time step, and (ii) a second observation characterizing the state of the environment at the next time step. The action prediction neural network may process the input to generate a prediction for the action performed by the agent that caused the state of the environment to transition from the first observation to the second observation. The system 300 may train the embedding neural network 302 and the action prediction neural network to optimize an objective function that measures an error between: (i) the predicted action generated by the action prediction neural network, and (ii) a "target" action that was actually performed by the agent. In particular, the system 300 may backpropagate gradients of the objective function through action prediction neural network and into the embedding neural network 302 at each of multiple training iterations. The objective function can be, e.g., a cross-entropy objective function. Training the embedding neural network in this manner encourages the controllability representations to encode information about the environment that is affected by the actions of the agent, i.e., controllable aspects of the environment.

In another example, the system 300 can jointly train the embedding neural network 302 with a state prediction neural network. The state prediction neural network can be configured to process an input including: (i) a controllability representation (generated by the embedding neural network 302) of an observation characterizing the state of the environment at a time step, and (ii) a representation of an action performed by the agent at the time step. The state prediction neural network may process the input to generate an output characterizing the predicted state of the environment at the next step, i.e., after the agent performed the action. The output may include, e.g., a predicted controllability representation characterizing the predicted state of the environment at the next time step. The system 300 can jointly train the embedding neural network 302 and the state prediction neural network to optimize an objective function that measures an error between: (i) the predicted controllability representation generated by the state prediction neural network, and (ii) a "target" controllability representation characterizing the actual state of the environment at the next time step. The "target" controllability representation can be generated by the embedding neural network based on an observation characterizing the actual state of the environment at the next time step. In particular, the system 300 may backpropagate gradients of the objective function through the state prediction neural network and into the embedding neural network 302 at each of multiple training iterations.

The objective function can be, e.g., a squared-error objective function. Training the embedding neural network in this manner encourages the controllability representations to encode information about the environment that is affected by the actions of the agent, i.e., controllable aspects of the environment.

Figure 4:
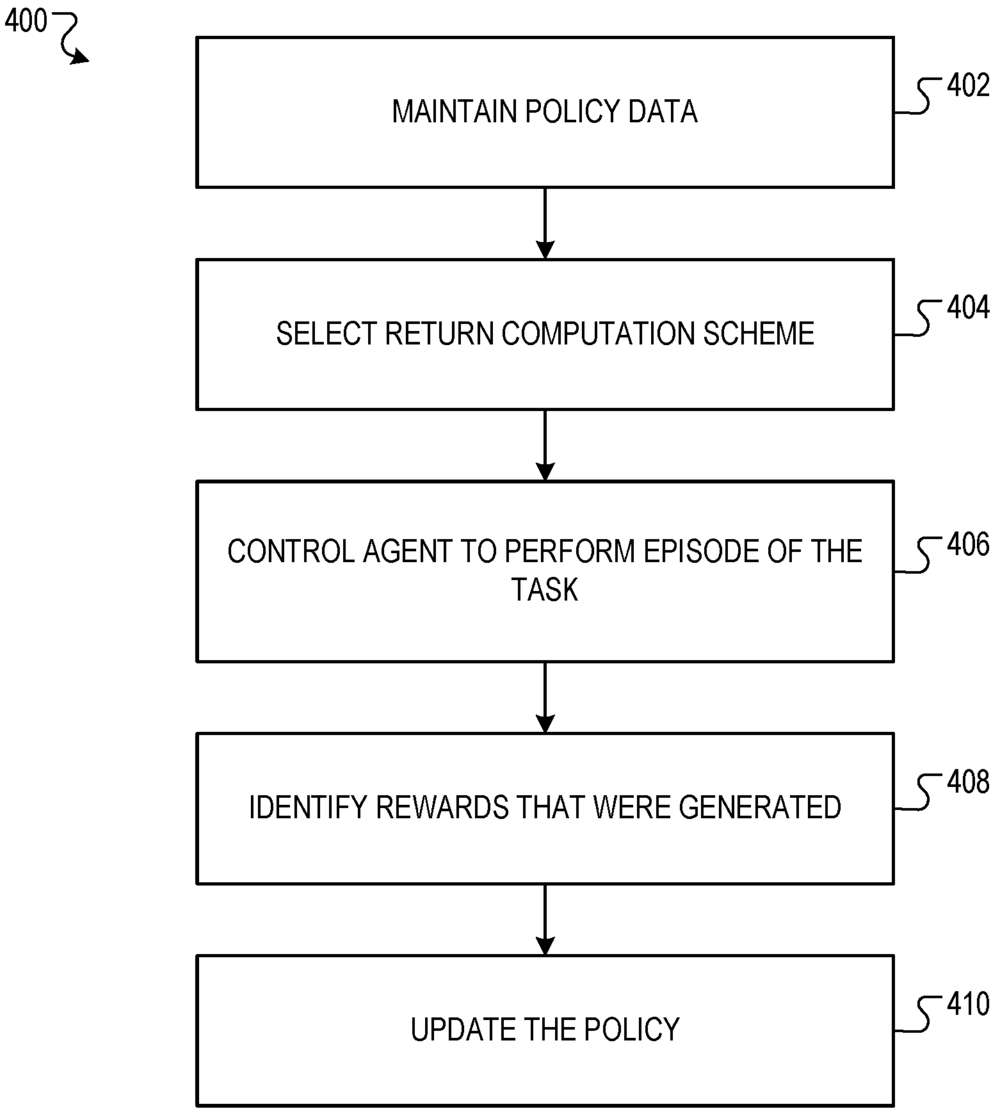
FIG. 4 is a flow diagram of an example process for controlling an agent to perform a task episode and for updating the return computation scheme selection policy.

FIG. 4 is a flow diagram of an example process 400 for performing a task episode and updating the return computation scheme selection policy. For convenience, the process 400 will be described as being performed by a system of one or more computers located in one or more locations. For example, an action selection system, e.g., the action selection system 100 of FIG. 1, appropriately programmed in accordance with this specification, can perform the process 500.

The system maintains policy data specifying a policy for selecting between multiple different return computation schemes, each return computation scheme assigning a different importance to exploring the environment while performing the episode of the task (step 402).

The system selects, using the policy, a return computation scheme from the multiple different return computation schemes (step 404). For example, the policy can assign a respective reward score to each scheme that represents a current estimate of a reward signal that will be received if the scheme is used to control the agent for an episode. As one example, to select the policy, the system can select the scheme that has the highest reward score. As another example, with probability ε the system can select a random scheme from the set of schemes and with probability 1-ε the system can select the scheme that has the highest reward score defined by the policy. As another example, to select the policy, the system can map the reward scores to a probability distribution over the set of return computation schemes and then sample a scheme from the probability distribution.

The system controls the agent to perform the episode of the task to maximize a return computed according to the selected return computation scheme (step 406). That is, during the task episode, the system conditions the action selection neural network(s) on data identifying the selected return computation scheme.

The system identifies rewards that were generated as a result of the agent performing the episode of the task (step 408). As a particular, example the system can identify the extrinsic rewards, i.e., the rewards that measure the progress on the task, that were received at each of the time steps in the task episode.

The system updates, using the identified rewards, the policy for selecting between multiple different return computation schemes (step 410).

Generally, the system updates the policy using a non-stationary multi-armed bandit algorithm having a respective arm corresponding to each of the return computation schemes.

More specifically, the system can generate a reward signal for the bandit algorithm from the identified rewards and then update the policy using the reward signal. The reward signal can be a combination of the extrinsic rewards received during the task episode, e.g., an undiscounted extrinsic reward that is an undiscounted sum of the received rewards.

The system can use any of a variety of non-stationary multi-armed bandit algorithms to perform the update.

As a particular example, the system can compute, for each scheme, the empirical mean of the reward signal that has been received for episodes within some fixed number of task episodes of the current episode, i.e., within a most recent horizon of fixed length. The system can then compute the reward score for each scheme from the empirical mean for the scheme. For example, the system can compute the reward score for a given scheme by adding a confidence bound bonus to the empirical mean for the given scheme. The confidence bound bonus can be determined based on how many times the given scheme has been selected within the recent horizon, i.e., so that schemes that have been selected fewer times are assigned larger bonuses. As a particular example, the bonus for a given scheme a computed after the k-th task episode can satisfy:

$$\beta\sqrt{\frac{1}{N_{k-1}(a,\tau)}} \text{ or } \beta\sqrt{\frac{\log(k-\min(k-1,\tau))}{N_{k-1}(a,\tau)}},$$

where β is a fixed weight, $N_{k-1}$ (a,τ) is the number of times the given scheme a has been selected within the recent horizon, and τ is the length of the horizon.

Thus, the system adaptively modifies the policy for selecting between return computation schemes during the training of the action selection neural network(s), resulting in different return computation schemes being favored by the policy (and therefore being more likely to be selected) at different times during the training. Because the policy is based on expected reward signals (that are based on extrinsic rewards) for the different schemes at any given point in the training, the system is more likely to select schemes that are more likely to result in higher extrinsic rewards being collected over the course of the task episode, resulting in higher quality training data being generated for the action selection neural network(s).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

The invention claimed is:

1. A method performed by one or more computers and for training a set of one or more action selection neural networks to control an agent interacting with an environment to perform episodes of a task, the method comprising:

maintaining data specifying a policy for selecting between multiple different return computation schemes, each return computation scheme assigning a different importance to exploring the environment while performing an episode of the task and specifying at least a respective intrinsic reward scaling factor that defines how much an intrinsic reward is scaled before being added to an extrinsic reward that is received from the environment when generating returns, the intrinsic reward scaling factors for two or more of the different return computation schemes being different respective positive numbers;

causing the agent to perform one or more episodes of the task, comprising, for each episode:

selecting, using the policy, a return computation scheme from the multiple different return computation schemes;

controlling the agent to perform the episode of the task to maximize a return computed according to the selected return computation scheme, wherein controlling the agent to perform the episode of the task according to the selected return computation scheme comprises repeatedly performing the following:

receiving an observation characterizing a current state of the environment;

processing the observation and data specifying the selected return computation scheme using the one or more action selection neural networks to generate an action selection output; and selecting an action to be performed by the agent using the action selection output;

identifying rewards that were generated as a result of the agent performing the episode of the task;

updating, using the identified rewards for at least one of the one or more episodes of the task, the policy for selecting between multiple different return computation schemes, wherein the policy is updated using a non-stationary multi-armed bandit algorithm having a respective arm corresponding to each of the return computation schemes;

generating training data from the performing of at least one of the one or more task episodes; and training the one or more action selection neural networks on the training data through reinforcement learning, wherein the one or more action selection neural networks comprise:

an intrinsic reward action selection neural network that estimates intrinsic returns computed only from intrinsic rewards generated by an intrinsic reward system based on observations received during interactions with the environment;

an extrinsic reward action selection neural network that estimates extrinsic returns computed only from extrinsic rewards received from the environment as a result of interactions with the environment; and wherein training the one or more action selection neural networks on the training data comprises:

training the intrinsic reward action selection neural network using only intrinsic rewards generated as a result of performances of the task episodes; and training the extrinsic reward action selection neural network using only extrinsic rewards received during performances of the task episodes.

2. The method of claim 1, wherein the multiple different return computation schemes each specify at least a respective discount factor used in combining rewards to generate returns.

3. The method of claim 1, wherein the environment is a real world environment, each observation is the output of at least one sensor configured to sense the environment, and the agent is a mechanical agent interacting with the environment.

4. The method of claim 1, wherein processing the observation and data specifying the selected return computation scheme using one or more action selection neural networks to generate an action selection output comprises, for each action in a set of actions:

processing the observation, the action, and the data specifying the selected return computation scheme using the intrinsic reward action selection neural network to generate an estimated intrinsic return that would be received if the agent performs the action in response to the observation;

processing the observation, the action, and the data specifying the selected return computation scheme using the extrinsic reward action selection neural network to generate an estimated extrinsic return that would be received if the agent performs the action in response to the observation; and determining a final return estimate from the estimated intrinsic reward and the estimated extrinsic reward.

5. The method of claim 4, wherein selecting an action to be performed by the agent using the action selection output comprises selecting the action with a highest final return estimate with probability 1−ε and selecting a random action from a set of actions with probability E.

6. The method of claim 1, wherein the intrinsic reward action selection neural network and the extrinsic reward action selection neural network have a same architecture but different parameter values.

7. The method of claim 1, wherein the policy assigns a respective reward score to each of the return computation schemes.

8. The method of claim 1, wherein updating, using the identified rewards, the policy for selecting between multiple different return computation schemes comprises:

determining an undiscounted extrinsic return from the extrinsic rewards received during performance of the task episode; and updating the policy by using the undiscounted extrinsic reward as a reward signal for the non-stationary multi-armed bandit algorithm.

9. One or more non-transitory computer storage media storing instructions that when executed by one or more computers cause the one or more computers to perform operations for training one or more action selection neural networks to control an agent interacting with an environment to perform episodes of a task, the operations comprising:

maintaining data specifying a policy for selecting between multiple different return computation schemes, each return computation scheme assigning a different importance to exploring the environment while performing an episode of the task and specifying at least a respective intrinsic reward scaling factor that defines how much an intrinsic reward is scaled before being added to an extrinsic reward that is received from the environment when generating returns, the intrinsic reward scaling factors for two or more of the different return computation schemes being different respective positive numbers;

causing the agent to perform one or more episodes of the task, comprising, for each episode:

selecting, using the policy, a return computation scheme from the multiple different return computation schemes;

controlling the agent to perform the episode of the task to maximize a return computed according to the selected return computation scheme, wherein controlling the agent to perform the episode of the task according to the selected return computation scheme comprises repeatedly performing the following:

receiving an observation characterizing a current state of the environment;

processing the observation and data specifying the selected return computation scheme using the one or more action selection neural networks to generate an action selection output; and selecting an action to be performed by the agent using the action selection output;

identifying rewards that were generated as a result of the agent performing the episode of the task;

updating, using the identified rewards for at least one of the one or more episodes of the task, the policy for selecting between multiple different return computation schemes, wherein the policy is updated using a non-stationary multi-armed bandit algorithm having a respective arm corresponding to each of the return computation schemes;

generating training data from the performing of at least one of the one or more task episodes; and training the one or more action selection neural networks on the training data through reinforcement learning, wherein the one or more action selection neural networks comprise:

an intrinsic reward action selection neural network that estimates intrinsic returns computed only from intrinsic rewards generated by an intrinsic reward system based on observations received during interactions with the environment;

an extrinsic reward action selection neural network that estimates extrinsic returns computed only from extrinsic rewards received from the environment as a result of interactions with the environment; and wherein training the one or more action selection neural networks on the training data comprises:

training the intrinsic reward action selection neural network using only intrinsic rewards generated as a result of performances of the task episodes; and training the extrinsic reward action selection neural network using only extrinsic rewards received during performances of the task episodes.

10. A system comprising one or more computers and one or more storage devices storing instructions that when executed by the one or more computers cause the one or more computers to perform operations for training one or more action selection neural networks to control an agent interacting with an environment to perform episodes of a task, the operations comprising:

maintaining data specifying a policy for selecting between multiple different return computation schemes, each return computation scheme assigning a different importance to exploring the environment while performing an episode of the task and specifying at least a respective intrinsic reward scaling factor that defines how much an intrinsic reward is scaled before being added to an extrinsic reward that is received from the environment when generating returns, the intrinsic reward scaling factors for two or more of the different return computation schemes being different respective positive numbers;

causing the agent to perform one or more episodes of the task, comprising, for each episode:

selecting, using the policy, a return computation scheme from the multiple different return computation schemes;

controlling the agent to perform the episode of the task to maximize a return computed according to the selected return computation scheme, wherein controlling the agent to perform the episode of the task according to the selected return computation scheme comprises repeatedly performing the following:

receiving an observation characterizing a current state of the environment;

processing the observation and data specifying the selected return computation scheme using the one or more action selection neural networks to generate an action selection output; and selecting an action to be performed by the agent using the action selection output;

identifying rewards that were generated as a result of the agent performing the episode of the task;

updating, using the identified rewards for at least one of the one or more episodes of the task, the policy for selecting between multiple different return computation schemes, wherein the policy is updated using a non-stationary multi-armed bandit algorithm having a respective arm corresponding to each of the return computation schemes;

generating training data from the performing of at least one of the one or more task episodes; and training the one or more action selection neural networks on the training data through reinforcement learning, wherein the one or more action selection neural networks comprise:

an intrinsic reward action selection neural network that estimates intrinsic returns computed only from intrinsic rewards generated by an intrinsic reward system based on observations received during interactions with the environment;

an extrinsic reward action selection neural network that estimates extrinsic returns computed only from extrinsic rewards received from the environment as a result of interactions with the environment; and wherein training the one or more action selection neural networks on the training data comprises:

training the intrinsic reward action selection neural network using only intrinsic rewards generated as a result of performances of the task episodes; and training the extrinsic reward action selection neural network using only extrinsic rewards received during performances of the task episodes.

11. The system of claim 10, wherein the multiple different return computation schemes each specify at least a respective discount factor used in combining rewards to generate returns.

12. The system of claim 10, wherein the environment is a real world environment, each observation is the output of at least one sensor configured to sense the environment, and the agent is a mechanical agent interacting with the environment.

13. The system of claim 10, wherein updating, using the identified rewards, the policy for selecting between multiple different return computation schemes comprises:

determining an undiscounted extrinsic return from the extrinsic rewards received during performance of the task episode; and updating the policy by using the undiscounted extrinsic reward as a reward signal for the non-stationary multi-armed bandit algorithm.

14. The system of claim 10, wherein processing the observation and data specifying the selected return computation scheme using one or more action selection neural networks to generate an action selection output comprises, for each action in a set of actions:

processing the observation, the action, and the data specifying the selected return computation scheme using the intrinsic reward action selection neural network to generate an estimated intrinsic return that would be received if the agent performs the action in response to the observation;

processing the observation, the action, and the data specifying the selected return computation scheme using the extrinsic reward action selection neural network to generate an estimated extrinsic return that would be received if the agent performs the action in response to the observation; and determining a final return estimate from the estimated intrinsic reward and the estimated extrinsic reward.

* * * * *